US 6,668,254 B2

(12) United States Patent
Matson et al.

(10) Patent No.: US 6,668,254 B2
(45) Date of Patent: Dec. 23, 2003

(54) METHOD AND SYSTEM FOR IMPORTING DATA

(75) Inventors: Ken Matson, Bellevue, WA (US);
Brian Clapper, Royersford, PA (US);
Matt Dymek, Fleming Island, FL (US);
Tom Hjellming, Wheaton, IL (US);
Bob Moyer, St. Davids, PA (US); Steve Stevens, Chalfont, PA (US)

(73) Assignee: Fulltilt Solutions, Inc., King of Prussia, PA (US)

( * ) Notice: Subject to any disclaimer, the term of this patent is extended or adjusted under 35 U.S.C. 154(b) by 232 days.

(21) Appl. No.: 09/741,766

(22) Filed: Dec. 21, 2000

(65) Prior Publication Data

US 2002/0124005 A1 Sep. 5, 2002

(51) Int. Cl.[7] .............................................. G06F 17/30
(52) U.S. Cl. ......................................... 707/10; 707/201
(58) Field of Search ........................ 707/10, 6, 2, 100, 707/101, 201, 523; 709/205, 201

(56) References Cited

U.S. PATENT DOCUMENTS

| 5,799,157 | A | | 8/1998 | Escallon ..................... 707/515 |
| 5,913,210 | A | | 6/1999 | Call ................................. 707/4 |
| 5,948,057 | A | * | 9/1999 | Berger et al. ................ 707/201 |
| 6,072,481 | A | | 6/2000 | Matsushita et al. ......... 707/506 |
| 6,163,602 | A | | 12/2000 | Hammond et al. ......... 379/114 |
| 6,208,990 | B1 | * | 3/2001 | Suresh et al. ............... 707/100 |
| 6,249,786 | B1 | * | 6/2001 | Wadewitz ...................... 707/6 |
| 6,397,232 | B1 | * | 5/2002 | Cheng-Hung et al. ........ 707/10 |

FOREIGN PATENT DOCUMENTS

| CA | 200-656674 | * 5/2000 | ............. G06F/3/14 |
| GB | 2 336 007 | 10/1999 | |
| WO | WO 98/49640 | 11/1998 | |

OTHER PUBLICATIONS

Junichi Suzuki and Yoshikazu Yamamoto, Titled "Managing the software design documents with XML" copyright 1998 ACM 1–58113–X/980009 pp. 127–136.*

Michelle A. Poolet: "SQL by Design: Why you need database normalization" SQL Server Magazine, Online! Mar. 1999 (Mar. 1999), pp. 1–2, XP002237946, retrieved from the internet <http://www.sqlmag.com/articles/print.cfm?articleID=4887>, pp. 1–6.

* cited by examiner

Primary Examiner—Diane D. Mizrahi
(74) Attorney, Agent, or Firm—Blank Rome LLP (57) ABSTRACT

A method and system for importing data comprising the downloading of product data from different sources and in different formats; processing the downloaded data by at least comparing it with data downloaded and stored in a product database; and reviewing the results of the comparison to detect differences in the data, the differences potentially being errors. The system and methods further comprise connecting the downloaded data from its supplier specific format into a standard format; comparing the downloaded data in the standard format with a previously downloaded data set saved in the standard format; categorizing the product data based on the results of the second comparison; and processing each category of data independently to automatically update the product database.

55 Claims, 4 Drawing Sheets

FIG. 1

FIG. 5
DATA IMPORT DELETED DATA PROCESSING PHASE

FIG. 2
DATA IMPORT PRE-PROCESSING PHASE

FIG. 3
DATA IMPORT DATABASE INSERT PHASE

FIG. 4

DATA IMPORT DATABASE UPDATE PHASE

METHOD AND SYSTEM FOR IMPORTING DATA

BACKGROUND OF THE INVENTION

1. Field of the Invention

This invention relates to the automation of product and vendor data entry where the product and vendor data is provided by one or more product suppliers and can potentially be provided in many different formats. In particular, this invention relates to methods and systems to automatically import, analyze, and categorize data from different sources and in many possible different formats, and to output the processed data to on-line business-to-business service providers or to any other recipient with an interest in the cleansed data.

2. Description of Related Art

Computer networks such as the Internet have facilitated the transfer of information among computer users. Business-to-business ("B2B") service providers, for example on-line shopping service providers, have taken advantage of the networking technologies to more efficiently and economically conduct their business transactions. The use of computers to transfer data, however, does not put an end to human intervention in the data transfer process.

Current on-line shopping web sites that offer a variety of products for sale, for example, face the formidable task of having to input and keep an inventory of the data related to the products they sell. Products are supplied by different sources which may also provide the information for the product being supplied.

Although the product data may be provided in electronic form, the on-line shopping service provider may have to enter the product information into their own databases manually. The reason for this is that there is no current data entry system that would convert product data formatted in any given manner to a standard format in which the data may be kept as part of the inventory database.

The data format problem is twofold. The first problem concerns the syntax of the data, which may differ according to the data supplier providing the data. A data supplier may, for example, use data transformation or conversion software such as Data Junction or InfoPump, both commercially available, to produce data with a given syntax or format.

The second problem, which is harder to solve than the first one, concerns the use of different terminology (semantics) by different product data suppliers in order to describe the same product. For example, one product supplier may use the term "IBM" while another may use "International Business Machines" as part of the description of the same product. That is, the descriptions for the same product may vary widely. Like the data syntax problem, this problem is associated with data formatting.

Consequently, there is a need in the art for a system that automates the data entry operation for products supplied by different sources where the data may be found in as many different formats. Further, there is a need in the art for a system that maps the different representations of a product into a common set of product information while preserving the original data sent by the different suppliers for use as a reference.

SUMMARY AND OBJECTS OF THE INVENTION

Automated data importation methods and systems are disclosed. Specifically, such methods and systems enable an on-line shopping service provider to import product and vendor data being provided in different formats by different suppliers into a single product database. The on-line service provider acquires product and vendor data from a plurality of suppliers. Each acquired data set of a given type from a given supplier is compared to a product data set of the same type from the same supplier that had previously been acquired and that resides in the product database. The results of the comparison are reviewed as part of a data import preprocessing analysis.

The acquired supplier-specific data set is then converted to a standard data format before being further compared to a previously acquired data set stored in the standard format. The second comparison results in the categorization of data. The categorized data is used by different processes in order to automatically update the product database.

An object of the present invention is to provide methods and systems that enable the entry of data into a database system where the data is provided by different sources in different formats and where the entry takes place in an automated fashion. Further, it is another object of the invention to provide methods and systems that map different representations of a product included in different datasets into a common set of product information while maintaining the original datasets. Further, it is another object of the present invention to provide on-line shopping service providers with the ability to maintain a retail database containing product information that is up-to-date. Still further, it is another object of the present invention to achieve the objects stated above by minimizing human intervention in the importation of data into the retail database.

With these and other objects, advantages and features of the invention that may become hereinafter apparent, the nature of the invention may be more clearly understood by reference to the following detailed description of the invention, the appended claims and to the several drawings attached herein.

BRIEF DESCRIPTION OF THE DRAWINGS

The preferred embodiments of this invention will be described in detail, with reference to the following figures, wherein.

These and other features and advantages of this invention are described in or are apparent from the following detailed description of the preferred embodiments.

DETAILED DESCRIPTION OF THE PREFERRED EMBODIMENTS

Although on-line shopping is used in this section to describe the invention, the present invention is not limited to on-line shopping services. Similarly, the transfer of data is not limited to transfers via the Internet. Thus, the processing of data taught by the present invention would apply, for example, to data being transferred among computers (by any transmission means).

Figure 1:
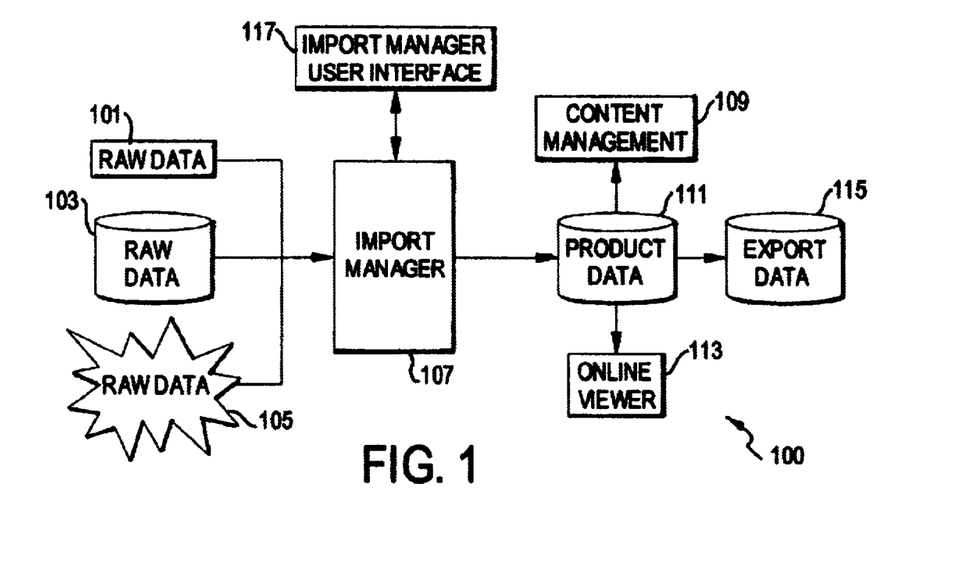
FIG. 1 is a drawing of one embodiment of the system of the present invention.

Referring now to the drawings in which like elements are shown by like reference numerals, FIG. 1 shows a high-level block diagram of one embodiment of a system 100 of the present invention. The system 100 may include sources of data 101, 103, and 105, which may correspond to different product suppliers; an Import Manager ("IM") 107; a Product Data Database 111; a Content Management Module 109; and an On-Line viewer 113.

The data may relate to products to be sold on-line by a company where the product transactions occur via a web site associated with that company. The sources 101, 103, or 105, of the data may include (but are not limited to) legacy system data streams, real-time data feeds, archived data media, flat files which are text delineated and/or comma delineated, and database files. The data may vary according to the source with respect to quality, format, and terminology used.

The data may be imported from product suppliers such as manufacturers, trade service agencies, distributors, specialty vendors, or any other suppliers.

The IM 107, the Content Manager 109, and the On-Line viewer 113 may be implemented as software modules running in a computer or in a distributed computing environment. The IM 107 automates the importation of data from the data sources 101, 103, and 105, in order to minimize labor-intensive manual intervention. The functions performed by the IM 107 are described with reference to FIGS. 2–5.

The Product Data Database 111 stores the product data after it has been imported and processed by the IM 107. The processed product data in the database 111 is available to both the Content Manager 109 and the On-Line viewer 113. The user interacts with the IM 107 via the Import Manager UI 117.

One advantage of the present invention is that the company providing the on-line shopping service ("on-line shopping service provider") does not necessarily have to install software into their computer systems that would carry out the invention disclosed herein. Instead, they can obtain access to the product database 111 by having a contractor import the data into the database 111 and then place it in an export data file 115 for their access. This allows the normalized, cleansed data to be easily imported into any third-party catalog system.

A graphical user interface ("GUI") may be displayed to an operator of the system 100 so that the operator enters commands to instruct the Content Manager 109 to perform specific operations or functions. These functions, for example, may include creating and maintaining multiple custom product catalogs, each organized uniquely (i.e., creating product classification hierarchies); maintaining detailed information on suppliers and manufacturers; assigning products to one or more product classification hierarchies; defining standard terminology for product attribute names or values; defining a template hierarchy independent of product classification hierarchies; defining templates within the template hierarchy to enforce uniform sets of attributes and rules for different product types; and defining lists of all allowable attribute values (i.e., valid ranges) for different product types. The content management operations (i.e., those manual operations which touch the product data database 111 directly) may be carried out by servlets. A servlet may be defined as a Java extension to a web server that enhances the web server's functionality.

The On-Line viewer 113 may be implemented by a GUI presenting to a user multiple custom product catalogs, displaying an unlimited number of attributes per product, and displaying one or more images per product. The GUI associated with the On-Line viewer 113 may also be used, for example, to conduct parametric searches on attributes, global text searches, or global searches by manufacturer, vendor, part number, or descriptors. Further, that GUI may display more than one product, enabling a user to conduct a side-by-side detailed comparison of the products.

The Import Manager UI 117 may be displayed to the user to manage and control the operations of the Import Manager 107. It may be used, for example, to display products in the various queues, map supplier original terminology to standard terminology, control the loading of supplier data into the IM processing stream, commit changes to the Product Data 111, etc.

When a data download is received from data suppliers from any of the sources 101, 103 and 105, a number of operations are performed by the IM 107 to analyze the data and prepare it for import into the database 111. The tasks performed during this pre-processing phase are explained below.

The following discussion assumes that the dataset received from a supplier 101 is a complete download. A complete download may be defined as a complete listing of all product data from that supplier for a given portion of the supplier's data. Processing of update (delta) datasets (i.e., a dataset containing products that are changed or removed from a product catalog associated with the specific supplier providing the dataset) is described in the discussion of FIG. 2. A data supplier may choose to provide distinct subsets of their data as separate datasets, for example electrical equipment as opposed to plumbing equipment. This is referred to as supplier datatype.

Figure 2:
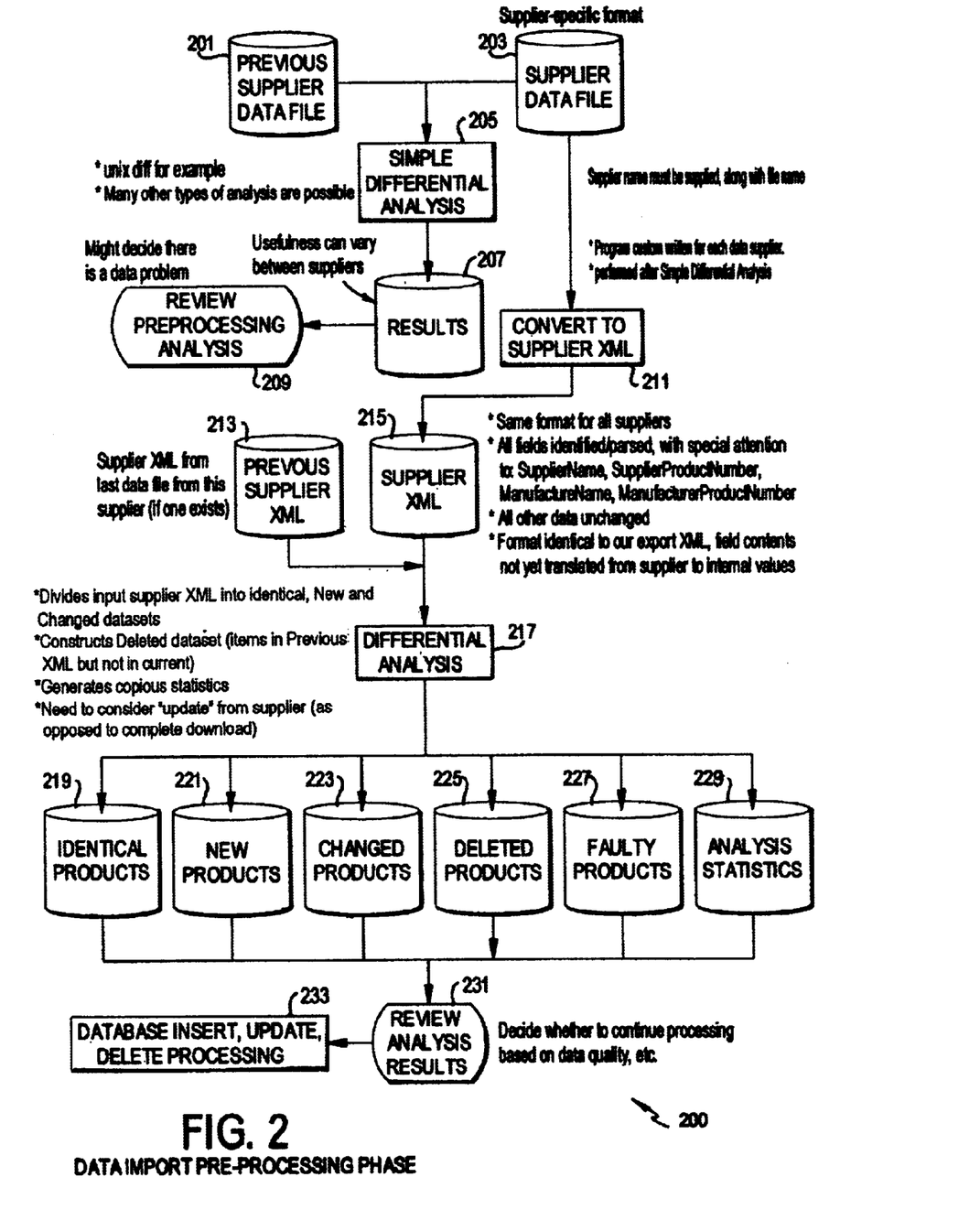
FIG. 2 is a drawing of a flow chart of one embodiment of the data preprocessing method of the present invention.

The data import pre-processing phase is shown in FIG. 2. The records corresponding to a supplier (e.g., 101) entering the IM 107 for analysis are first stored in a data file 203 and then compared to records previously stored in a file 201. The previously stored records correspond to a previous instance in which the supplier sent information corresponding to the products available through the supplier. That is, every time a supplier sends product data to the IM 107, that data is compared to the data corresponding to the supplier and already stored in the system. The data in both files 201 and 203 may be saved in a supplier-specific format. The comparison or analysis may be carried out by simple differential analysis 205, which may be implemented, for example, by applying the UNIX command "diff" to the data stored in file 203 and the data stored in file 201.

Simple differential analysis 205 is an automatic process (e.g., the execution of the UNIX command "diff"). Depending on the data format, file construction method, etc. this process can yield useful information. It does not yield useful information when the data supplier 101 submits a delta dataset, submits a data file in an exotic format (e.g., pdf), or the data supplier's file creation process does not tend to list the products in similar order in subsequent runs. Many data downloads, however, may be suitable for this type of analysis. The results of this analysis may preclude further processing. The results of the analysis are stored in file 207 to await the review of the preprocessing analysis 209 by a human operator (e.g., data load technician). The human operator may then decide whether there is a problem associated with the data.

As an alternative or in addition to simple differential analysis 205, the data load technician can use many other tools to gain insight into the contents of the latest supplier data file 203. In fact, the input data should be subjected to significant review before proceeding with the import process, especially for data from new or unreliable suppliers. These tools include, but are not limited to, viewing the file in a text editor, loading relational data into a database such as Oracle and executing various retrievals, and analyzing the data in an Excel spreadsheet. The main goal is to avoid feeding data into the data import process without having a thorough understanding of that data beforehand. The level of effort required to achieve that understanding of a given dataset depends on several factors. The factors include the amount of experience with a given data supplier and the data quality demonstrated by that data supplier in the past. The more reliable the downloaded data is, the less the human intervention required to import the data.

Another aspect of the pre-processing phase 200 is the conversion of the supplier data format into a standard data format. That standard data format may be XML. All the data may be converted to the XML format before being imported. The software program that implements this function may be customized for each data supplier as required.

The conversion to XML 211 is an automatic process and may be performed after the simple differential analysis 205. The process 211 converts the supplier data file into an XML file. An XML file may be defined as a file containing valid XML (extensible markup language). The supplier data is parsed as completely as possible. Parsing may be defined as extracting information from the supplier-specific data format so that it may be dealt with appropriately (e.g., constructing the XML file). In particular, the following fields in a supplier data record should be parsed (or constructed): supplier name, supplier product number, manufacturer name, manufacturer product number, vendor name, and vendor product number. In addition, all other fields should be parsed as completely as the supplier format allows. This means that every "field" that the supplier supplies/identifies as part of the dataset will be parsed from the input file and stored as separate elements in the supplier XML file.

All parsing is assumed to be product independent. In particular, parsing product attributes from descriptions using regular expression matching is not done at this stage (it may be performed during the Product Attribution stage that is part of the Insert and Update Phases). Certain standard product attributes should be constructed if possible, including a short description. An attribute may be defined as a piece of data that describes or identifies a given product.

Once the data from the supplier data file 203 is converted to a standard form (e.g., XML), the data is stored in the supplier XML file 215. The supplier XML file 215 and the export XML file (not shown) use the same document type definition ("DTD"), describing the allowable form of the XML file, since the export XML should be able to contain supplier original data values (i.e., the values from the supplier data file). Therefore the data exported from the system may include original data from the supplier and the standardized data (which has had all supplier idiosyncracies removed).

The previous supplier XML file 213 includes the supplier XML data from the last data file, if one exists for the given supplier. The data stored in the supplier XML file 215 and the previous supplier XML file 213 are then analyzed by the differential analysis process 217. The differential analysis 217 is an automatic process that looks at the supplier XML and the supplier XML from the last download for the supplier data processed and does an intelligent "diff" based on intimate, detailed knowledge of the data format of the supplier XML data files. Specifically, the differential analysis process splits the input data into separate data files (described below), and produces voluminous statistical analysis data.

The data files into which the input data are split are the identical products data file 219, the new products data file 221, the changed products data file 223, the deleted products data file 225, the faulty products data file 227, and the analysis statistics data file 229.

The identical products data file 219 includes the same product (with identical attributes) that was present in the previous data download from this supplier (i.e., products that were unchanged with respect to the previous data download for this supplier). The data in file 219 may be discarded since no product changes need to be imported into the regularized product database 111. The new products data file 221 includes products that are new (from this supplier) in the most recent download. The changed products data file 223 includes products that existed in the previous download from this supplier, but something about the product has changed in the current download. The deleted products data file 225 includes products from the previous download not present in the current download.

The faulty products data file 227 includes products whose records have at least one the following missing: Supplier Name, Supplier Product Number, Manufacturer Name, Manufacturer Product Number, Vendor Name, and Vendor Product Number.

The statistics generated by the differential analysis 217 are stored in the analysis statistics data file 229 as well as in the database 111. Complete statistics should be maintained regarding the processing of an import batch. In particular, the following statistics are useful, although more statistics may be kept:

Input product count
   n Identical products
   n New products
   n Changed products
   n Deleted products
   n Faulty products
Output product count (starting with New, Changed and Deleted products above)
   n Products inserted
   n Products updated
   n Products deleted
   n Products rejected The Output product count statistics reflect the operation of the import process. Therefore, those statistics are stored upon completion of the import process.

The differential analysis process 217 processes delta datasets in a different fashion. Such datasets only identify new, changed, and deleted products. If the supplier provides a delta dataset, then the previously described pre-processing phase changes only slightly. For example, the simple differential analysis 205 would not provide any useful data. The conversion to XML 215 would be the same, and the differential analysis 217 may construct the new products data file 221, the changed products data file 223, and the deleted products data file 225 directly from the supplier XML data file 215.

The delta data set might not explicitly identify products as new versus changed, i.e., a supplier might just supply a dataset containing only "things that have changed in the data." In this case, the IM 107 will correctly sort out the difference between new and changed products.

Once the data is categorized by the differential analysis 217, it is reviewed 231 by the data load technician. After the review, the data may be loaded into the IM 107 to be inserted, updated or deleted 233 from the database 111.

Figure 3:
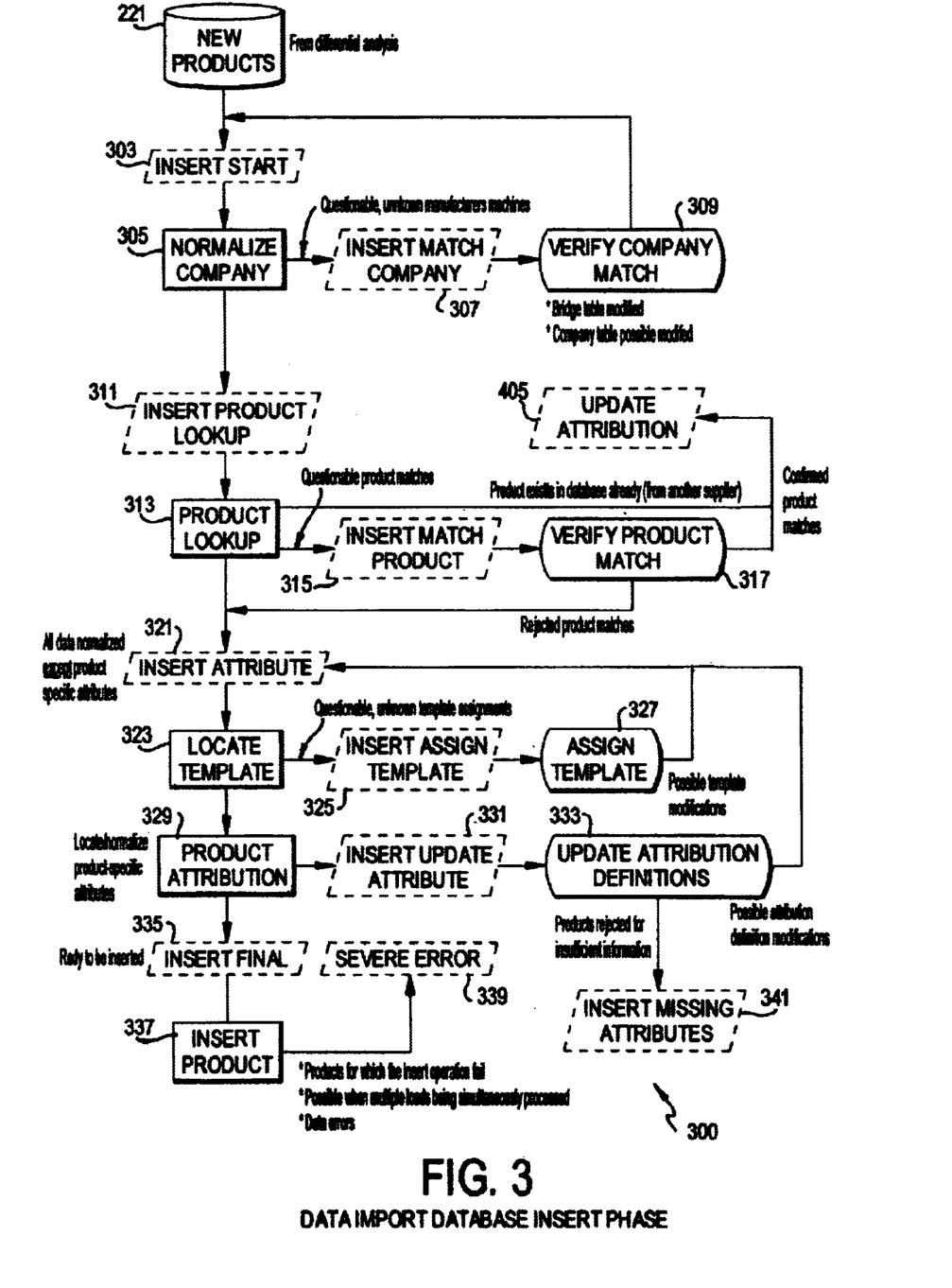
FIG. 3 is a drawing of a flowchart of one embodiment of the data insertion method of the present invention.

FIG. 3 illustrates the process 300 used to insert product data into the database 111 as part of the import process. The process starts with the new products data file 221 and the changed products data file 223 produced by differential analysis 217. The new and changed products data is held in a queue 303 before import processing begins.

The Normalize Company process 305 is an automatic operation. It ensures that the manufacturer and the vendor listed as part of the new and changed product data being loaded exist in the production database 111. If the manufacturer and vendor are found (via bridge table lookups), the product is moved into the Product Lookup queue 311. If either the manufacturer or the vendor is not found, or if there are questionable or unknown manufacturer matches, the product is placed in the Insert Match Company queue 307 and is thereafter verified by a technician 309.

The Verify Company Match operation 309 results in a company bridge table update and possibly a company table update followed by the transfer of the product data back into the Insert Start queue 303. The company bridge table and company table updates performed in this step permit the successful processing of the product record by the Normalize Company task 305 the next time it is fetched from the Insert Start queue 303.

Both of the tables referenced above may be part of the database 111. The company bridge table may include company names as received from the data supplier. That table also points to a corresponding entry in the company table.

The company table may include the definition of a normalized, reference company. Further, all products in the database 111 refer to the company table to indicate the manufacturer and vendor.

The use of the two tables above allows for automatic processing of products that refer to a company that has already been mapped (i.e., an entry has been made in the company bridge table and that entry points to an entry in the company table). The use of the tables also allows the retrieval of data from the database 111 in both normalized and original supplier terms.

Figure 4:
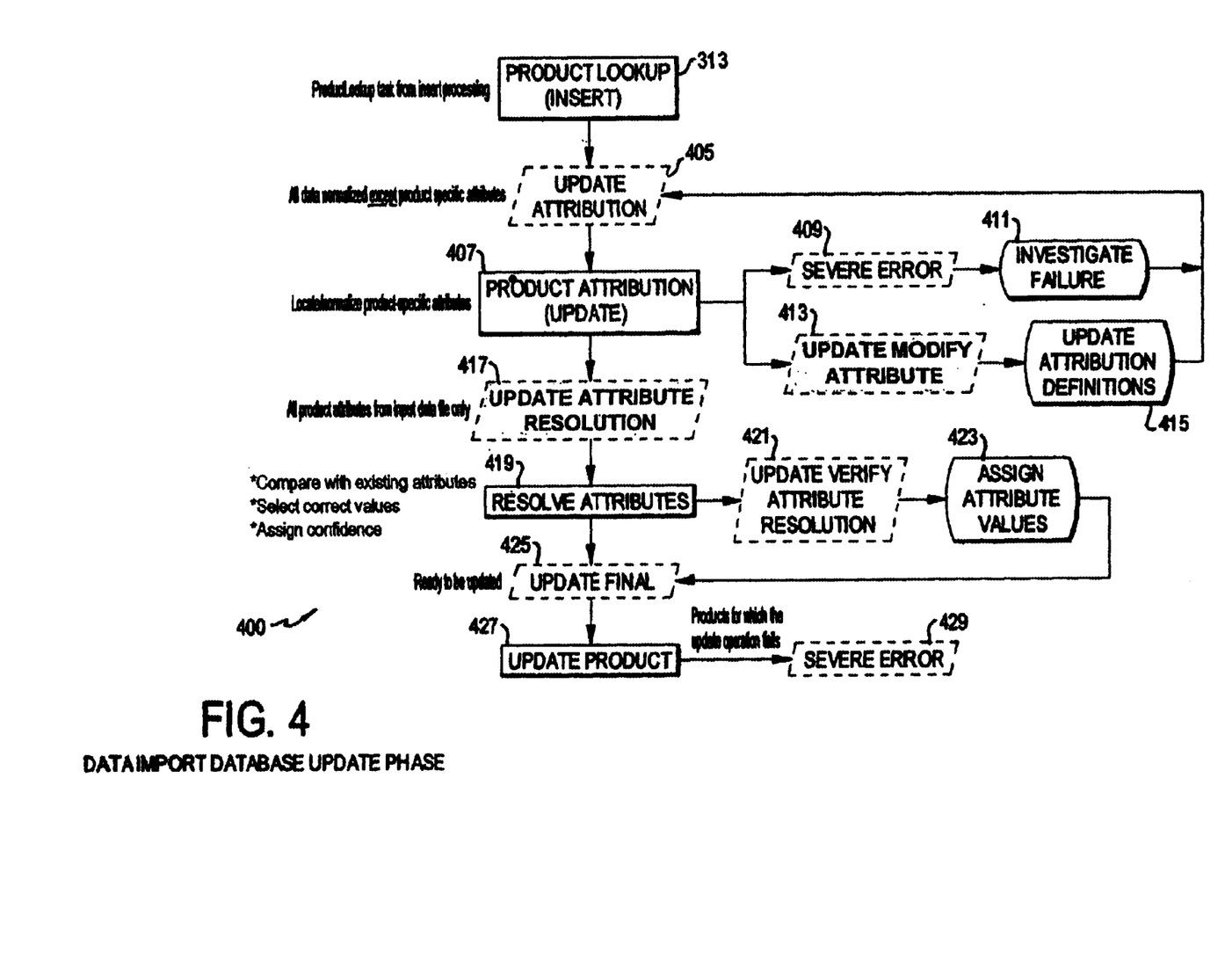
FIG. 4 is a drawing of a flowchart of one embodiment of the data updating method of the present invention.

The Product Lookup process 313 is an automatic operation that identifies products that might already exist in the production database 111 (from this or another supplier). This process 313 takes a product from the Insert Product Lookup queue 311 and attempts to find that product in the product database 111. The product lookup uses a key of the ManufacturerName/ManufacturerPartNumber and VendorName/VendorPartNumber. If the product is found (exact match on the full product key) in the database 111, the product is moved into the Update Attribution queue 405 for update processing. If the product was not found, it is moved into the Insert Attribute queue 321. If the product lookup process fails as a result of questionable product matches, the product is moved into the Insert Match Product queue 315. Making this routing decision is a somewhat complicated process and is described below.

The ugliness of the input data is a constant theme in this system. That applies to product identification as well as all other forms of processing. With that in mind, it is important to consider what it means to succeed/fail when looking up a product in the product database 111 based on information from the input data (e.g., source 101). In particular, data elements from the input data file are used as keys for searches in the production database 111. These keys may include SupplierName/SupplierProductId and Manufacturer Name/ManufacturerProductId.

In the product insert phase, an attempt is made to find whether a given input product (which has been asserted to be new from the manufacturer 101) already exists in the database 111. First, a simple data query is performed based on the information above. That query either returns a match or it doesn't. The actions to be taken based on the results of the query depend on how much trust is put in the data from the input data feed. This "trust" in the results of the query mainly depends on the confidence placed on the data supplier (e.g., history of providing accurate data); the current condition of the database 111, (i.e., if the database is empty and the datafeed has 50,000 products, one might choose to trust the results of the query for the initial data load) and the size of the datafeed. To deal with all these issues, such decisions should be made (independently) configurable. At the start, the possibilities may be defined as (for a particular batch load) matches (accept all or schedule all for verification), and misses (accept all or schedule all for verification). The possibilities may be expanded.

The Verify Product Match process 317 is performed by a technician. If the possible match is verified, the product is moved into the Update Attribution queue 405. Otherwise the product is moved into the Insert Attribute queue 321.

The Verify Product Match process 317 is only required when the Product Lookup automatic task 313 is unable to make a reliable decision on a product match. This situation is expected to occur in at least the following circumstances:

1) The Product Lookup task was unable to find a matching product in the database and confidence in the decision for this supplier was defined to be low
2) The Product Lookup task then performed a fuzzy (or probabilistic) query for a matching product
3) The search process resulted in ambiguous results The Locate Template process 323 is an automatic operation that attempts to locate a template for the present product. A template may be defined as a standard definition for this product type, including required attributes and their acceptable values. For example:

Laboratory Beaker
   Material (glass, pyrex, plastic)
   Capacity (milliliters, minimum value 0, maximum value 5000)
Copper Wire
   Size (AWG)
   Insulation material
   Ampacity When a product (from a data supplier) is assigned to a given template, we then immediately know a lot about the product, including required information to be retrieved from the supplier product data and added to the production database. Additionally, since the definition of all products assigned to a given template (from any combination of data suppliers) must be built according to the template, supplier differences in descriptions, attribute values, etc. are removed. This makes product comparison, searching, etc., much easier and more reliable.

If an appropriate template is not found, the product is moved to the Insert Assign Template queue 325.

Templates cannot be found for new products by directly examining products inserted in the past. The Locate Template process 323 must examine the Supplier Original Attributes fields in the current product and compare those to products from the same supplier that contained similar Supplier Original Attributes that were subsequently promoted to product attributes.

It is unlikely that simple product comparisons will result in a definitive fit of a new supplier product to a template.

Therefore, manual verification 327 would likely be required. Another approach may be taken when the data supplier has grouped the products into categories (supplier-specific). If the supplier-specific categories can be mapped into an internal template hierarchy, automatic template assignments can be made for new products. Even when the mapping is imperfect, it can still be useful by constraining the search set of possible templates that the user will have to consider when manually specifying a template for a given product.

If a template is not located, the Assign Template process 327 is performed by a technician. As part of this process, data corresponding to a product is taken from the queue 325 and the technician assigns a template for that product. The technician may also create a new template. After assigning a template, the software will look for supplier products that are similar. The user may choose to assign the similar products to the same template.

The Product Attribution process 329 is an automatic operation that locates and normalizes attributes for the product and fits them to the requirements of the Template Attributes (such as unit conversion on values). For example, if the Template Attribute requires its value to be expressed in inches, then all supplier original attributes that are mapped to that Template Attribute have their value converted from their specified units to inches. Once again, this facilitates product comparison, searching and load quality control. If attribution fails, the product is moved into the Insert Update Attribute queue 331. Otherwise the product is moved into the Insert Final queue 335.

If description parsing (to locate attribute names and/or values) is required, it will be done during step 329. There may be more potential attributes in the supplier data than might be needed to apply a product into a template. There is no automatic extension of a template to use these new attributes. The potential for new attributes is noted but not acted on.

The Update Attribution Definitions process 333 is also performed by a technician. Its main function is to update attribution definitions such that the Product Attribution process 329 succeeds. As a result of the Update Attribution Definitions process 333, the product data may be placed in the Insert Missing attributes queue 341. That queue 341 contains products rejected by the data technician as containing insufficient information to be loaded into the production database 111. Products in that queue require examination before deciding whether to manually enter the data or discard the product.

The Insert Final queue 335 contains normalized, fully attributed product definitions. No products make it into this queue unless it is expected that the subsequent Insert Product process 337 will succeed. The Insert Product process 337 is an automatic operation that inserts products into production database 111. When multiple supplier downloads are being processed in parallel, an identical, new product may be present in both downloads. Since the product data is not committed to the product database 111 until the Insert Product operation 337, the same product may exist twice in the Insert Final queue 335 (once for each supplier download). That situation will be detected during operation of the Insert Product process 337 and the duplicate product will be transferred to the severe error queue 339.

The Severe Error queue 339 contains products that are detected as duplicates by the insert product task 337 (only when the same new product comes in simultaneously in two different import batches); or for which the insert failed due to data errors.

There are many other ways for products to get into the Severe Error queue 339. In general, any product that a data technician can't figure out how to fix (or how to modify the support tables such that the product can be inserted/updated) will end up in this queue. Then an expert operator can figure out how to modify the data such that the product can be processed.

As a record of how/why products end up in the Severe Error queue 339 is developed, the queue may be broken down further. That is, it may be broken down into more specific queues with specific reasons for a product ending up in the queue.

FIG. 4 illustrates the process 400 used to update product data in the database 111 as part of the import process. That is, FIG. 4 illustrates the process of importing changed products into the production database 111.

The process 400 starts with products determined to already exist in the database by the Product Lookup process 313. The processing flow is nearly identical to that of the New Data Import processing 300.

The Product Lookup process 313 is an automatic operation and is used to confirm the existence of a product in the production database 111. If the product is located in the product database 111, the product is routed to the Update Attribution queue 405.

The Product Attribution (Update) process 407 is an automatic operation used to update the attributes of a product. One difference between the Product Attribution (Update) process 407 and the Product Attribution process 329 in FIG. 3 is that process 329 concerns required attributes. Process 329 insists that all required attributes be present, while in process 407 it is not required to check that all required attributes are present (since some "missing" attributes might already in the product database 111). If the product is malformed in some way (fails prerequisite tests, etc), it is routed to Severe Error queue 409 for manual processing. If the product is correctly formed, but has new information available (i.e. cannot be processed using previously entered mapping rules or bridge table entries), it is sent to the Update Modify Attribute queue 413 for mapping by Update Attribution Definitions 415. This operation is similar to that in the Insert Update Attribute queue 331 and associated UI 333.

There may be other paths to the Severe Error queue 409. For example, a data technician might decide that there is some unrecoverable error with a product that is being processed (as part of the normal processing flow) and assign the product to this queue. If the error is corrected, the product data is then forwarded to the Update Attribute queue 405.

Once attributes are updated, the data is placed in the Update Attribute Resolution queue 417. The Resolve Attributes process 419 is an automatic operation used to compare attribute values specified in the input data with those present in the product database 111.

The system allows the user to specify complex rules for deciding which data to use (new or existing) as an attribute. For example, if is the user has a high degree of confidence in the data from Supplier X and a low degree of confidence in the data from Supplier Y, the data from Supplier X would be used to describe the product even if it is older than the data from Supplier Y. This may be done on a very granular level. For example, if Supplier Y provides some data that is not present in the data from Supplier X, that data will be used in conjunction with the data from Supplier X. If Supplier X provides the same type of data at a later date, it will overwrite the data from Supplier Y at that time. Data will flow into the Update Verify Attribute Resolution queue 421 when the data falls outside the rules of automatic processing. For example, the user may configure the mapping rules such that they want to look at any data from Supplier Y when it contradicts data from Supplier X. The Assign Attribute Values process 423 is performed by a technician in order to resolve any difficulties resulting from the Resolve Attributes process 419.

The Update Final queue 425 contains normalized, fully attributed product definitions. No products make it into this queue unless it is expected that the subsequent Update Product process 427 will succeed. If any errors are detected, the product data goes into the Severe Error queue 429. The Update Product process 427 is an automatic operation used to update product information in the product database 111.

Figure 5:
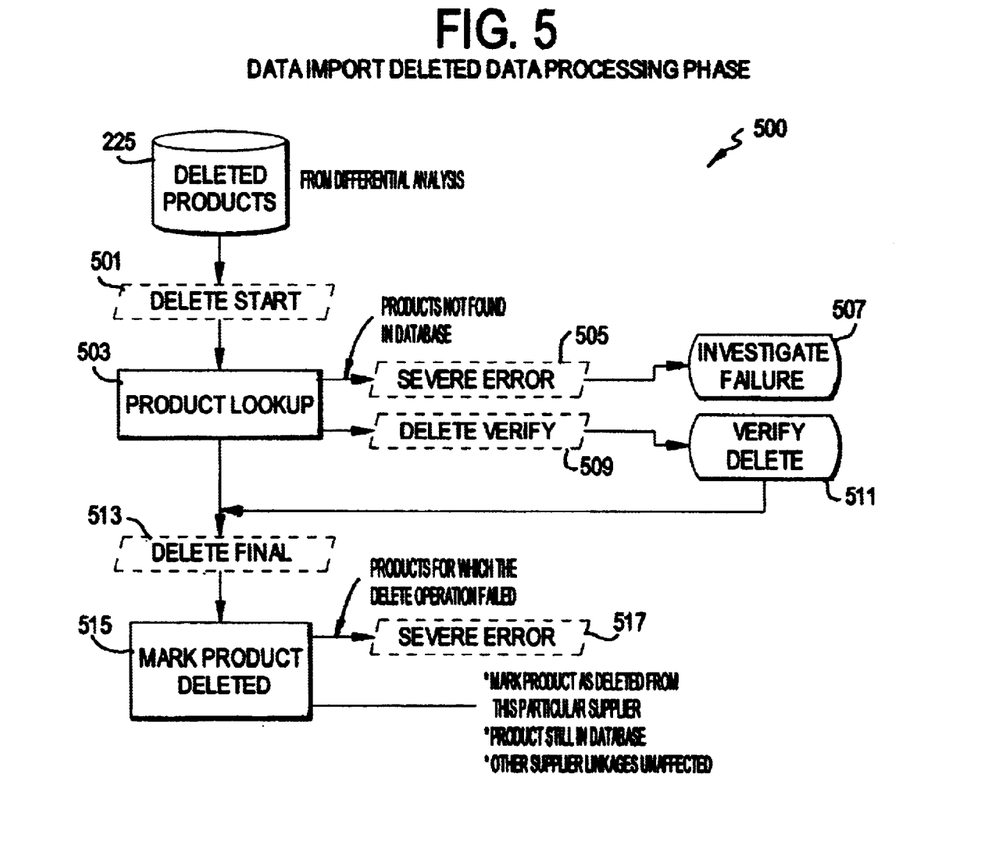
FIG. 5 is a drawing of a flowchart of one embodiment of the delete data processing method of the present invention.

FIG. 5 illustrates the process 500 used to handle products identified as deleted in the PreImport Analysis 200. The process 500 starts with the deleted products data file 225 produced by the differential analysis 217. The data then goes into Delete Start queue 501 to await further processing.

The process 500 does not necessarily delete records from the database 111. When a supplier identifies a product as deleted, at most it may be removed from that supplier in the product database 111. The product itself may still be available from other suppliers. When the last supplier for a given product has marked it for deletion, we then have a product in the database 111 for which there is no supplier.

The Product Lookup process 503 is an automatic operation used to confirm the existence of a product in the production database 111. It is essentially the same process as in the New Data Import processing 300 of FIG. 3.

The Severe Error queue 505 contains product records for which normal processing revealed an unexpected error, usually an integrity error in the production database 111. Addressing these errors (products) is considered outside the normal processing flow and therefore would be assigned to a "senior" data technician. In the Deleted Data processing 500, if the product is not found in the database 111, it is inserted into the Severe Error queue 505. There might be other paths to this queue. For example, a data technician might decide that there is some unrecoverable error with a product that is being processed (in the normal processing flow) and the technician decides to assign product to this queue. Further, the technician may investigate 507 the reason why the product in the Delete Start queue 501 did not exist in the product database 111.

If the product cannot be automatically processed as deleted (due to configuration/confidence), it is added to the Verify Delete queue 509. The Verify Delete process 511 allows the user to confirm/deny the proposed delete processing.

Once a product is ready for further processing as a deleted product, it is passed on to the Delete Final queue 513. The Mark Product Deleted process 515 is an automatic operation used to mark products as deleted in the production database 111 for a given supplier. Products for which the delete operation has failed are passed on to the Severe Error queue 517. Occasionally either a data technician or an automatic process might decide that a product cannot be processed using their knowledge and capabilities. When this happens, the product will be routed to the Severe Error queue 517. This queue is provided for the following reasons:

1) The product must be removed from the mainstream of import processing
2) All products inserted into this queue require some kind of special processing.

A senior data technician can examine products in this queue and decide what should be done to process the product or to decide that the product should be discarded.

While this invention has been described in conjunction with the specific embodiments outlined above, it is evident that many alternatives, modifications and variations are apparent to those skilled in the art. Accordingly, the preferred embodiments of the invention as set forth above are intended to be illustrative and not limiting. Various changes may be made without departing from the spirit and scope of the invention.

Two examples of potential areas in which the data cleansing methods of the present invention may be used follow:

1.) A company has multiple plant locations and each location has its own procurement system to buy products that are needed. The company wants to understand what they are buying across the enterprise. If two independent plants (and therefore two independent procurement systems) store the product data differently, the company has a need to consolidate these two independent datastores.

2.) Any company that needs to manage product and vendor data, where that data originates from disparate sources and disparate format where there may exist product attributes that they care about keeping track of and where there exists a need to categorize/classify those products. Forms of data (other than "Products") can be cast into the data and processing model. For example, a company may have multiple sites across the country in which diagnostic laboratory tests are performed. Each site has its own Laboratory Information System ("LIS") in which the various diagnostic tests are identified and maintained, and in which results for each text are captured and stored.

Each site's LIS is independent from all of the others, and consequently, the actual code used to identify a specific lab test will be different across the multiple LIS's. Further, there may even be inconsistency within each LIS, where the identical lab test may be entered multiple times, each time including a different identifier.

The company wants to be able to extract lab test results from all of the multiple testing sites and combine this data to create information products for both internal use & potentially for sale to external entities (e.g., Phamaceutical Manufacturers, Managed Healthcare Companies, etc.). In order to accomplish this goal, the company must be able to bridge all of these different lab test codes from their multiple testing sites to a single, standardized version of these lab tests (a 'Lab Test Master' database). Only then would they be able to aggregate lab test results from their various sites & produce meaning reports, graphs, and other information products from this data.

A problem results from the fact that each of the multiple independent testing sites can create new codes for existing lab tests at any time or introduce entirely new tests (which they had never been performing before) at any time. Thus, there exists an ongoing requirement to detect and bridge new lab test codes which have never been encountered before.

Finally, there exists a need to categorize or group lab tests in various ways (by 'Type of Test' such as 'Blood Test', 'Cholesterol Test', etc. or by 'Diagnosis', etc.) for reporting purposes.

What is claimed is:

1. A data importation method comprising:

receiving first product data in a first format;

comparing the first product data with second product data previously received;

reviewing results of the comparison to determine whether there is a problem with the first product data;

changing a format of the first product data to a standard format;

comparing the standard format first product data with third product data, the third product data corresponding to the second product data having format changed to the standard format;

placing the standard format first product data in a category based on the comparison of the standard format first product data with the third product data; and generating statistics based on the comparison of the standard format first product data with the third product data.

2. The method of claim 1, wherein placing the standard format first product data in a category comprises placing the standard format first product data in an identical products file.

3. The method of claim 1, wherein placing the standard format first product data in a category comprises placing the standard format first product data in a new products file.

4. The method of claim 3, further comprising:

retrieving original supplier data for an original supplier product;

normalizing at least one company in the retrieved supplier data;

looking up the original supplier product in a product database to determine whether data corresponding to the original supplier product has been provided by other suppliers;

locating a template for the original supplier product corresponding to the retrieved supplier data;

normalizing at least one attribute from the retrieved supplier data by using the template;

defining normalized product data as the supplier data having the normalized at least one company and the normalized at least one attribute; and inserting the normalized product data into the product database.

5. The method of claim 4, wherein the step of normalizing at least one company comprises normalizing vendors and manufacturers associated with the product.

6. The method of claim 4, wherein the looking the product up step comprises determining whether the retrieved product data already exists in the product database.

7. The method of claim 6, further comprising:

comparing the normalized at least one attribute with existing attributes;

selecting correct attribute values; and updating the normalized product data in the product database with the correct attribute values.

8. The method of claim 4, wherein looking up the retrieved product data step is performed by a human operator when an attempt to automatically perform the looking up step fails.

9. The method of claim 4, further comprising a step of assigning a template for the original supplier product data when a template has not been located automatically before normalizing the at least one attribute by using the template.

10. The method of claim 4, further comprising a step of updating attribution definitions before the step of inserting the normalized product data.

11. The method of claim 4, further comprising:

identifying a category associated with the original supplier product;

retrieving original supplier data for other original supplier products; and optionally assigning to the located template all products in the other supplier original products corresponding to the identified category.

12. The method of claim 4, further comprising:

retrieving original supplier data for other original supplier products similar to manually-assigned product; and optionally assigning to the located template original supplier products in the original supplier data that are similar to the manually-assigned product.

13. The method of claim 1, wherein placing the standard format first product data in a category comprises placing the standard format first product data in a changed products file.

14. The method of claim 1, wherein placing the standard format first product data in a category comprises placing the standard format first product data in a deleted products file.

15. The method of claim 14, further comprising:

retrieving product data from the delete products file;

looking up the retrieved product data in the product database;

deleting from the database the retrieved product data, which corresponds to a first supplier, when a product corresponding to the retrieved product data has not been deleted for all other suppliers.

16. The method of claim 15, further comprising:

marking the product as deleted when the first supplier is an only supplier having the product undeleted in the database at the time of looking up the retrieved product data in the database.

17. The method of claim 1, wherein placing the standard format first product data in a category comprises placing the standard format first product data in a faulty products file.

18. A method for normalizing product data comprising:

retrieving original supplier data for an original supplier product;

normalizing at least one company in the retrieved supplier data;

looking up the original supplier product in a product database to determine whether data corresponding to the original supplier product has been provided by other suppliers;

locating a template for the original supplier product corresponding to the retrieved supplier data;

normalizing at least one attribute from the retrieved supplier data by using the template;

defining normalized product data as the supplier data having the normalized at least one company and the normalized at least one attribute; and inserting the normalized product data into the product database.

19. The method of claim 18, wherein the step of normalizing at least one company comprises normalizing vendors and manufacturers associated with the product.

20. The method of claim 18, wherein the looking the product up step comprises determining whether the retrieved product data already exists in the product database.

21. The method of claim 20, further comprising:

comparing the normalized at least one attribute with existing attributes;

selecting correct attribute values; and updating the normalized product data in the product database with the correct attribute values.

22. The method of claim 18, wherein looking up the retrieved product data step is performed by a human operator when an attempt to automatically perform the looking up step fails.

23. The method of claim 18, further comprising a step of assigning a template for the original supplier product data when a template has not been located automatically before normalizing the at least one attribute by using the template.

24. The method of claim 18, further comprising a step of updating attribution definitions before the step of inserting the normalized product data.

25. The method of claim 18, further comprising:
identifying a category associated with the original supplier product;
retrieving original supplier data for other original supplier products; and
optionally assigning to the located template all products in the other supplier original products corresponding to the identified category.

26. The method of claim 18, further comprising:
retrieving original supplier data for other original supplier products similar to manually-assigned product; and
optionally assigning to the located template original supplier products in the original supplier data that are similar to the manually-assigned product.

27. A method for processing data comprising:
receiving data from a first queue;
applying a data transformation rule to process the received data;
transferring the processed data to a second queue if the application of the data transformation rule is successful; and
performing the following steps if the application of the data transformation rule is not successful:
transferring the received data to a third queue;
receiving manual commands for processing the data in the third queue;
processing the data in the third queue according to the manual commands; and
transferring to a fourth queue the data processed from the third queue.

28. The method of claim 27, wherein the application of the data transformation rule is not successful when the data received from the first queue is malformed.

29. The method of claim 27, wherein the application of the data transformation rule is not successful when the data received from the first queue is of an unknown type.

30. The method of claim 27, wherein the application of the data transformation rule is not successful when the data received from the first queue does not meet data cleansing definitions.

31. The method of claim 27, wherein the step of receiving manual commands comprises receiving a new data transformation rule.

32. The method of claim 27, wherein the step of receiving manual commands comprises receiving changes in the received data.

33. The method of claim 27, wherein the step of receiving manual commands comprises receiving instructions to discard the received data.

34. The method of claim 27, further comprising a step of saving the data transformation rule for use in a next import from the first queue.

35. The method of claim 27, wherein the step of applying a data transformation rule comprises normalizing product attribute data received from the first queue.

36. The method of claim 35, wherein the step of receiving manual commands comprises receiving updated attribution definitions.

37. The method of claim 27, wherein the step of receiving data from a first queue comprises receiving product data.

38. The method of claim 27, wherein the step of applying a data transformation rule comprises normalizing product manufacturer data received from the first queue.

39. The method of claim 38, the step of receiving manual commands comprises receiving a new company name.

40. The method of claim 38, further comprising:
searching for the product manufacturer in a database; and
determining that the step of applying the data transformation rule is successful when the product manufacturer is found in the database.

41. The method of claim 38, further comprising:
searching for the data transformation rule in a database; and
determining that the step of applying the data transformation rule is successful when the rule is found in the database.

42. The method of claim 38, further comprising:
searching for the product manufacturer in a first database;
searching for the data transformation rule in a second database; and
determining that the step of applying the data transformation rule is not successful when the product manufacturer is not found in the first database and the data transformation rule is not found in the second database.

43. The method of claim 42, wherein the first and second databases are the same.

44. The method of claim 27, wherein the step of applying a data transformation rule comprises normalizing product category data received from the first queue.

45. The method of claim 44, wherein the step of receiving manual commands comprises receiving a new product category.

46. The method of claim 44, further comprising:
searching for the product category in a database; and determining that the step of applying the data transformation rule is not successful when the product category is not found in the database.

47. The method of claim 44, further comprising:
searching for the data transformation rule in a database; and determining that the step of applying the data transformation rule is not successful when the rule is not found in the database.

48. The method of claim 44, wherein the step of normalizing product category data comprises assigning to a product a template corresponding to a product category.

49. The method of claim 27, wherein the fourth queue is the second queue.

50. The method of claim 27, wherein the fourth queue is the first queue.

51. The method of claim 27, wherein the step of receiving manual commands comprises receiving changes to the data transformation rule.

52. The method of claim 35, further comprising:
searching for a template attribute in a database; and
creating a product attribute corresponding to said template attribute.

53. In a data processing system, a computer-readable medium providing instructions that when implemented by a computer perform a method comprising:

receiving data from a first queue;

applying a data transformation rule to process the received data;

transferring the processed data to a second queue if the application of the data transformation rule is successful; and performing the following steps if the application of the data transformation rule is not successful:
 transferring the received data to a third queue;
 receiving manual commands for processing the data in the third queue;
 processing the data in the third queue according to the manual commands; and
 transferring to a fourth queue the data processed from the third queue.

54. The computer-readable medium of claim 53, wherein the fourth queue is the second queue.

55. The computer-readable medium of claim 53, wherein the fourth queue is the first queue.

* * * * *

UNITED STATES PATENT AND TRADEMARK OFFICE
CERTIFICATE OF CORRECTION

| | |
|---|---|
| PATENT NO. | : 6,668,254 B2 |
| APPLICATION NO. | : 09/741766 |
| DATED | : December 23, 2003 |
| INVENTOR(S) | : Ken Matson et al. |

It is certified that error appears in the above-identified patent and that said Letters Patent is hereby corrected as shown below:

On the face of the patent, under "(75) Inventors:", please change:

"(75) Inventors:  Ken Matson, Bellevue, WA (US);
Brian Clapper, Royersford, PA (US);
Matt Dymek, Fleming Island, FL (US);
Tom Hjellming, Wheaton, IL (US);
Bob Moyer, St. Davids, PA (US); Steve Stevens, Chalfont, PA (US)"

to:

--(75) Inventors:  Kenneth Matson, Bellevue, WA (US);
Brian Clapper, Royersford, PA (US);
Matthew Dymek, Fleming Island, FL (US);
Thomas Hjellming, Wheaton, IL (US);
Robert L. Moyer, St. Davids, PA (US);
Steven Stevens, Chalfont, PA (US)--

Signed and Sealed this

Eighth Day of May, 2007

JON W. DUDAS
*Director of the United States Patent and Trademark Office*